United States Patent
Kuroishi et al.

(10) Patent No.: US 9,069,303 B2
(45) Date of Patent: Jun. 30, 2015

(54) IMAGE PROCESSING APPARATUS, COMPUTER READABLE MEDIUM, AND IMAGE PROCESSING METHOD WITH DUAL HEATING MODES

(75) Inventors: Kenji Kuroishi, Kanagawa (JP); Sakae Okazaki, Kanagawa (JP); Masafumi Ono, Kanagawa (JP); Yohei Hirota, Kanagawa (JP); Hidenobu Kanda, Tokyo (JP); Hiroyuki Tanaka, Kanagawa (JP); Keita Kumokiri, Kanagawa (JP); Shinichi Kinoshita, Kanagawa (JP); Kazuo Fukawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 440 days.

(21) Appl. No.: 13/540,103

(22) Filed: Jul. 2, 2012

(65) Prior Publication Data

US 2013/0216252 A1   Aug. 22, 2013

(30) Foreign Application Priority Data

Feb. 22, 2012   (JP) .................. 2012-036071

(51) Int. Cl.
*G03G 15/20* (2006.01)
*G03G 15/00* (2006.01)
*H04N 1/23* (2006.01)
*H04N 1/29* (2006.01)
*H04N 1/00* (2006.01)

(52) U.S. Cl.
CPC ........ *G03G 15/2046* (2013.01); *G03G 15/5083* (2013.01); *G03G 2215/2035* (2013.01); *G03G 2215/2074* (2013.01); *G03G 2215/209* (2013.01); *H04N 1/00204* (2013.01); *H04N 1/00904* (2013.01); *H04N 1/2338* (2013.01); *H04N 1/2346* (2013.01); *H04N 1/295* (2013.01); *H04N 2201/0039* (2013.01); *H04N 2201/0094* (2013.01)

(58) Field of Classification Search
CPC .................................. G03G 15/2046
USPC .................................... 399/67, 82
See application file for complete search history.

(56) References Cited

U.S. PATENT DOCUMENTS

2004/0145763 A1 *  7/2004  Dougherty et al. .......... 358/1.13
2009/0290916 A1    11/2009  Baba

FOREIGN PATENT DOCUMENTS

JP     A-08-286549     11/1996
JP     A-2009-282413   12/2009

* cited by examiner

*Primary Examiner* — Billy Lactaoen
(74) *Attorney, Agent, or Firm* — Oliff PLC

(57) ABSTRACT

Provided is an image processing apparatus including a mode switching unit that selectively switches a mode between a rapid heating mode and a heat accumulating mode in a fixing unit, a receiving unit that receives an image formation request received from the outside, an extracting unit that extracts mode switching determination information at the earliest from the image formation request received by the receiving unit, a selecting unit that selects the mode based on the mode switching determination information extracted by the extracting unit, specifications of the fixing device, and a current temperature, and a switching control unit that controls the mode switching unit based on the mode selected by the selecting unit to switch the mode to the rapid heating mode or the heat accumulating mode.

14 Claims, 13 Drawing Sheets

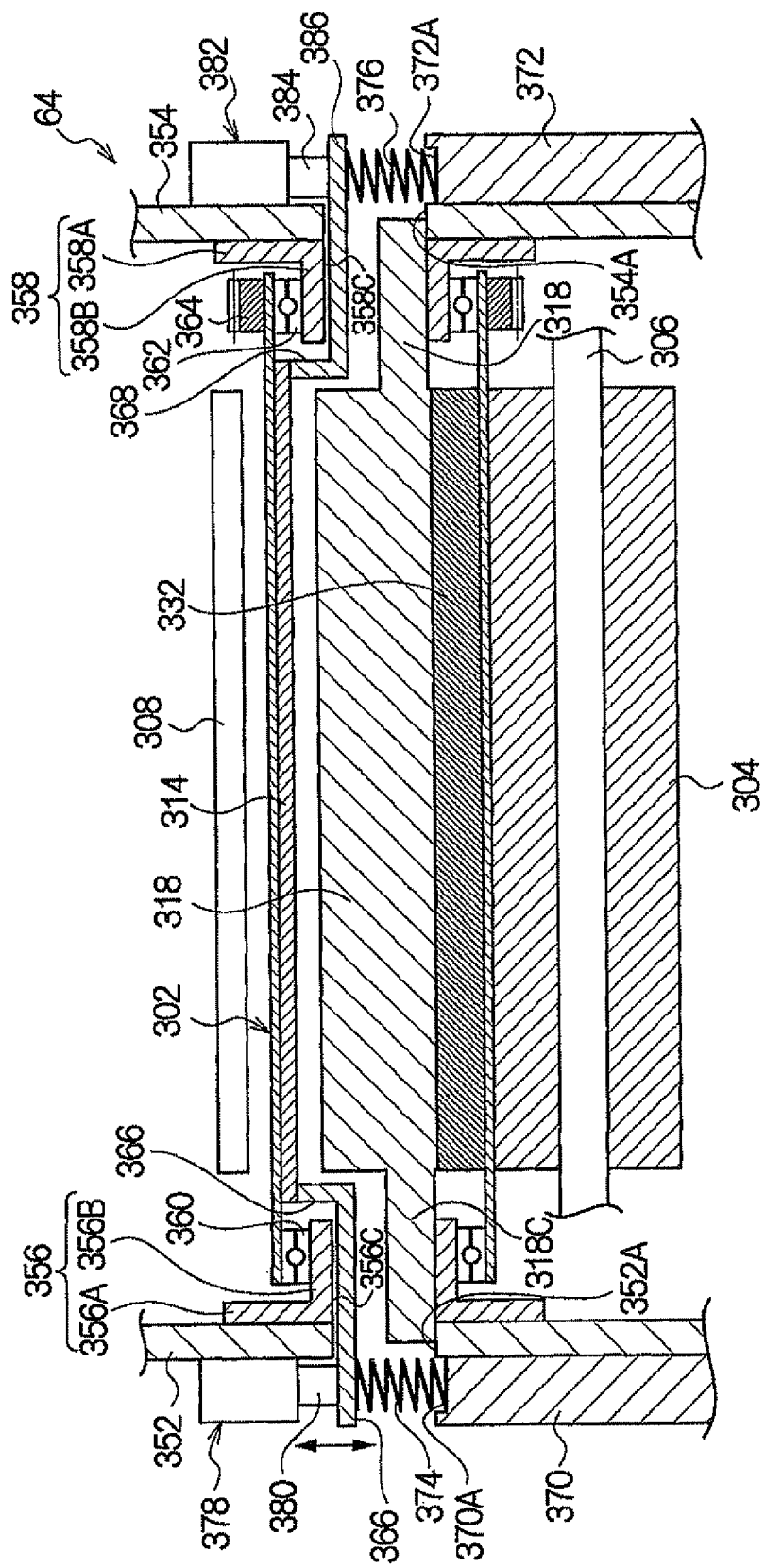

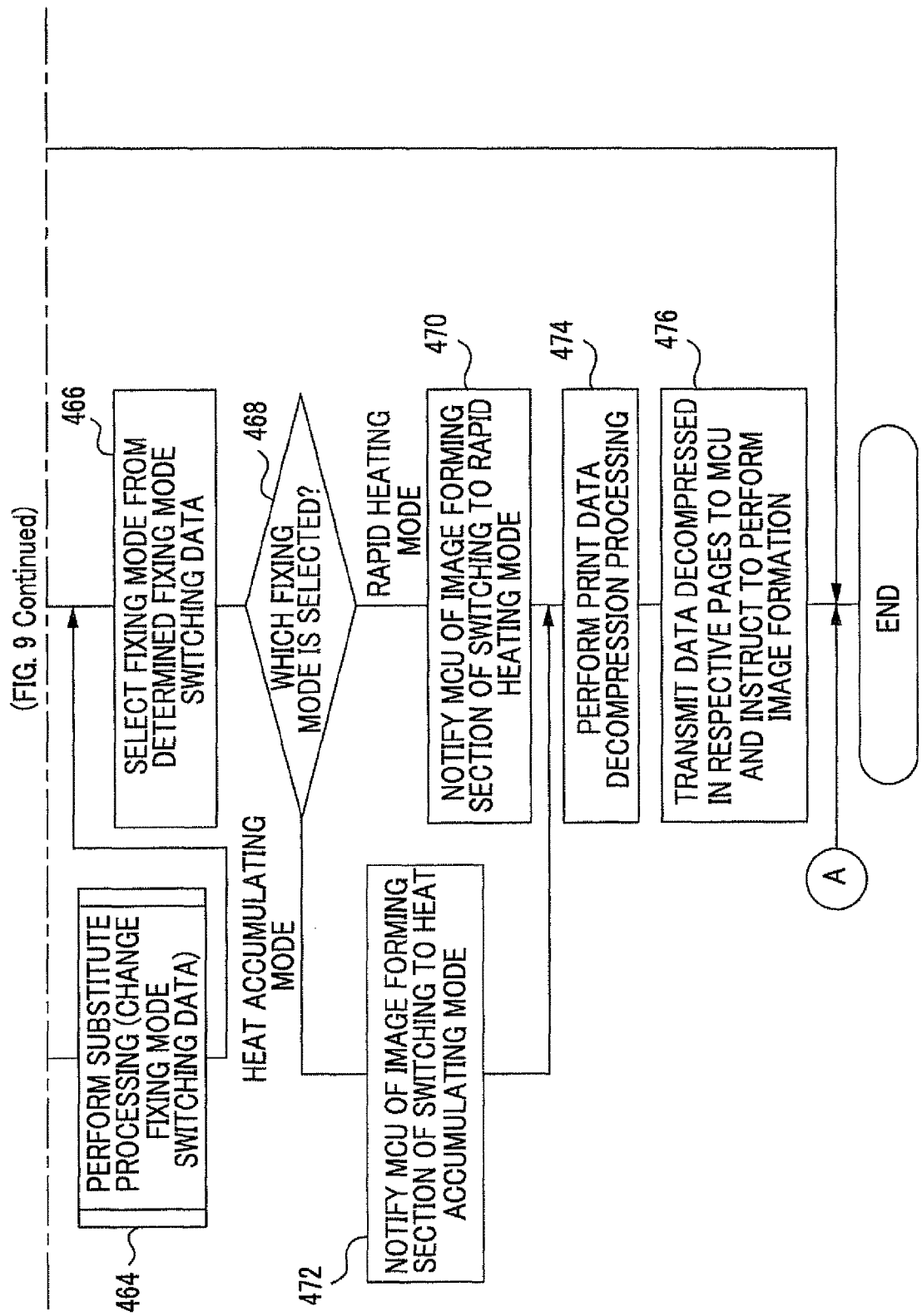

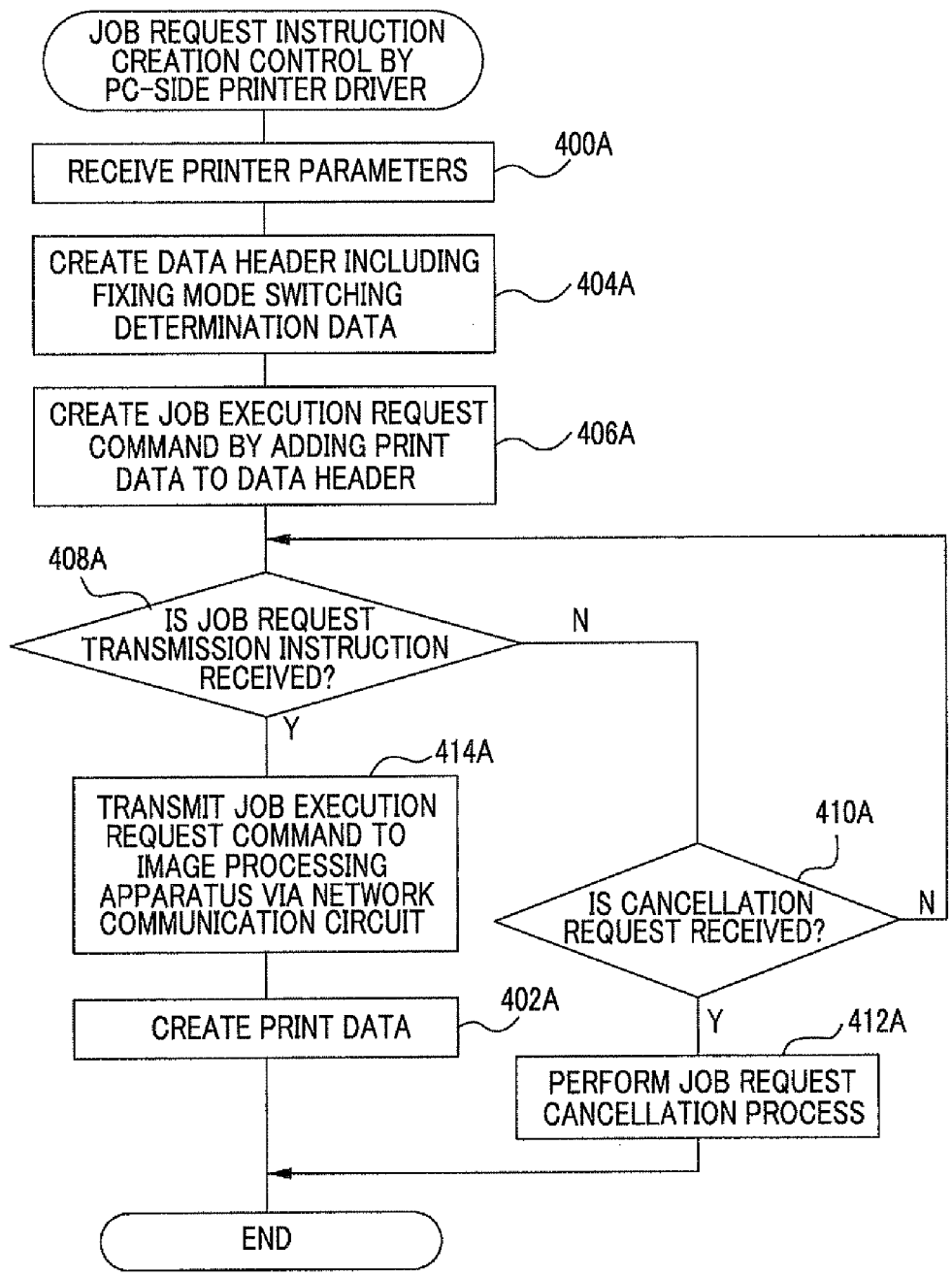

IMAGE PROCESSING APPARATUS, COMPUTER READABLE MEDIUM, AND IMAGE PROCESSING METHOD WITH DUAL HEATING MODES

CROSS-REFERENCE TO RELATED APPLICATIONS

This application is based on and claims priority under 35 USC 119 from Japanese Patent Application No. 2012-036071 filed Feb. 22, 2012.

BACKGROUND

Technical Field

The present invention relates to an image processing apparatus, an image processing control driver, and an imaging processing method.

SUMMARY

According to an aspect of the present invention, there is provided an image processing apparatus including: a mode switching unit that selectively switches a mode between a rapid heating mode, which is a mode of heating a fixing member contacting a recording sheet in advance and which aims for relatively rapid heating, and a heat accumulating mode which aims for heat accumulation to achieve a relatively high productivity in a fixing unit which functions as a part of an image forming section and which performs at least a heating process on the recording sheet to fix developer to the recording sheet after a developing process is performed on the recording sheet using the developer; a receiving unit that receives an image formation request received from the outside; an extracting unit that extracts mode switching determination information at the earliest from the image formation request received by the receiving unit; a selecting unit that selects the mode based on the mode switching determination information extracted by the extracting unit, specifications of the fixing device, and a current temperature; and a switching control unit that controls the mode switching unit based on the mode selected by the selecting unit to switch the mode to the rapid heating mode or the heat accumulating mode.

BRIEF DESCRIPTION OF THE DRAWINGS

Exemplary embodiments of the present invention will be described in detail based on the following figures, wherein:

FIG. 6 is a cross-sectional view illustrating a contacting/separating unit of the fixing device according to the present exemplary embodiment;

FIGS. 7A to 7D illustrate the fixing device according to the present exemplary embodiment, in which FIG. 7A is a partial cross-sectional view illustrating a separated state of the contacting/separating unit, FIG. 7B is a front view illustrating a separated state of a temperature-sensitive magnetic member, FIG. 7C is a partial cross-sectional view illustrated a contacting state of the contacting/separating unit, and FIG. 7D is a front view illustrating a contacting state of the temperature-sensitive magnetic member;

FIG. 10 is a flowchart illustrating a job request instruction creation control routine by a PC-side printer driver according to a modification example.

DETAILED DESCRIPTION

Figure 1A:
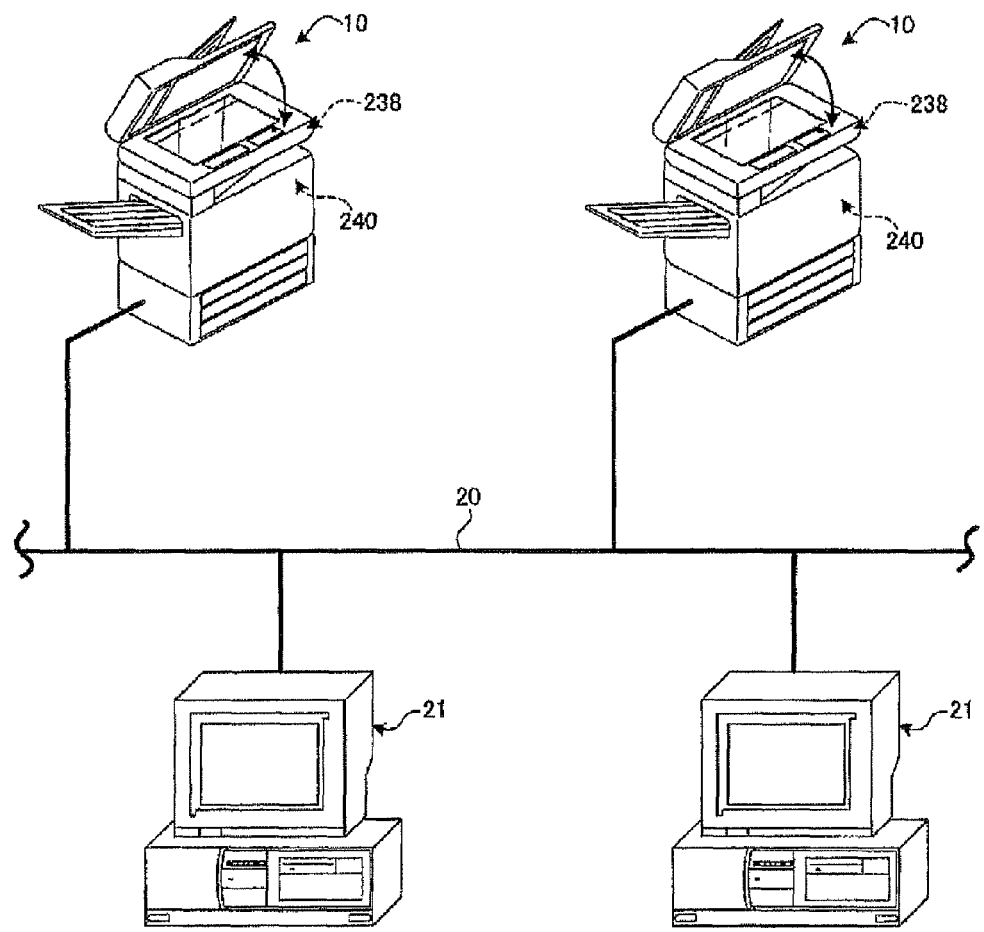
FIGS. 1A and 1B are connection diagrams of a communication circuit network including an image processing apparatus according to an exemplary embodiment.
Figure 1B:
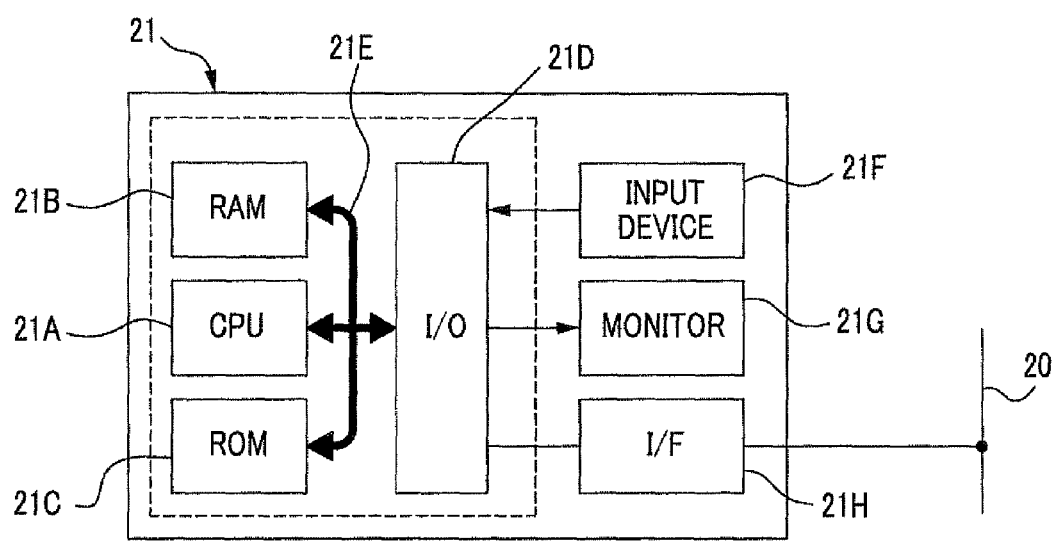

As illustrated in FIGS. 1A and 1B, an image processing apparatus 10 according to the present exemplary embodiment is connected to a network communication circuit 20 such as the Internet. In FIGS. 1A and 1B, although two image processing apparatuses 10 are connected, the number thereof is not limited to this, and one or three or more image processing apparatuses may be connected.

Moreover, multiple personal computer (PCs) 21 serving as information terminals are connected to the network communication circuit 20.

As illustrated in FIG. 1B, the PC 21 includes a CPU 21A, a RAM 21B, a ROM 21C, an I/O 21D, and a bus 21E such as a data bus or a control bus connecting these components to each other.

An input device 21F such as a keyboard or a mouse and a monitor 21G are connected to the I/O 21D. Moreover, the I/O 21D is connected to the network communication circuit 20 via an I/F 21H.

In FIG. 1A, although two PCs 21 are connected, the number thereof is not limited to this, and one or three or more PCs 21 may be connected. Moreover, the information terminal is not limited to the PC 21, and the PC 21 may not necessarily be connected by wires. That is, the communication circuit network may transmit and receive information by wireless.

As illustrated in FIGS. 1A and 1B, in the image processing apparatus 10, a user may issue an image formation (print) instruction at a remote site from the PC 21 by transmitting data, for example, to the image processing apparatus 10, or the user may issue instructions to perform processes such as copying, scanning (image reading), or transmission/reception of facsimiles by various operations in front of the image processing apparatus 10.

Figure 2:
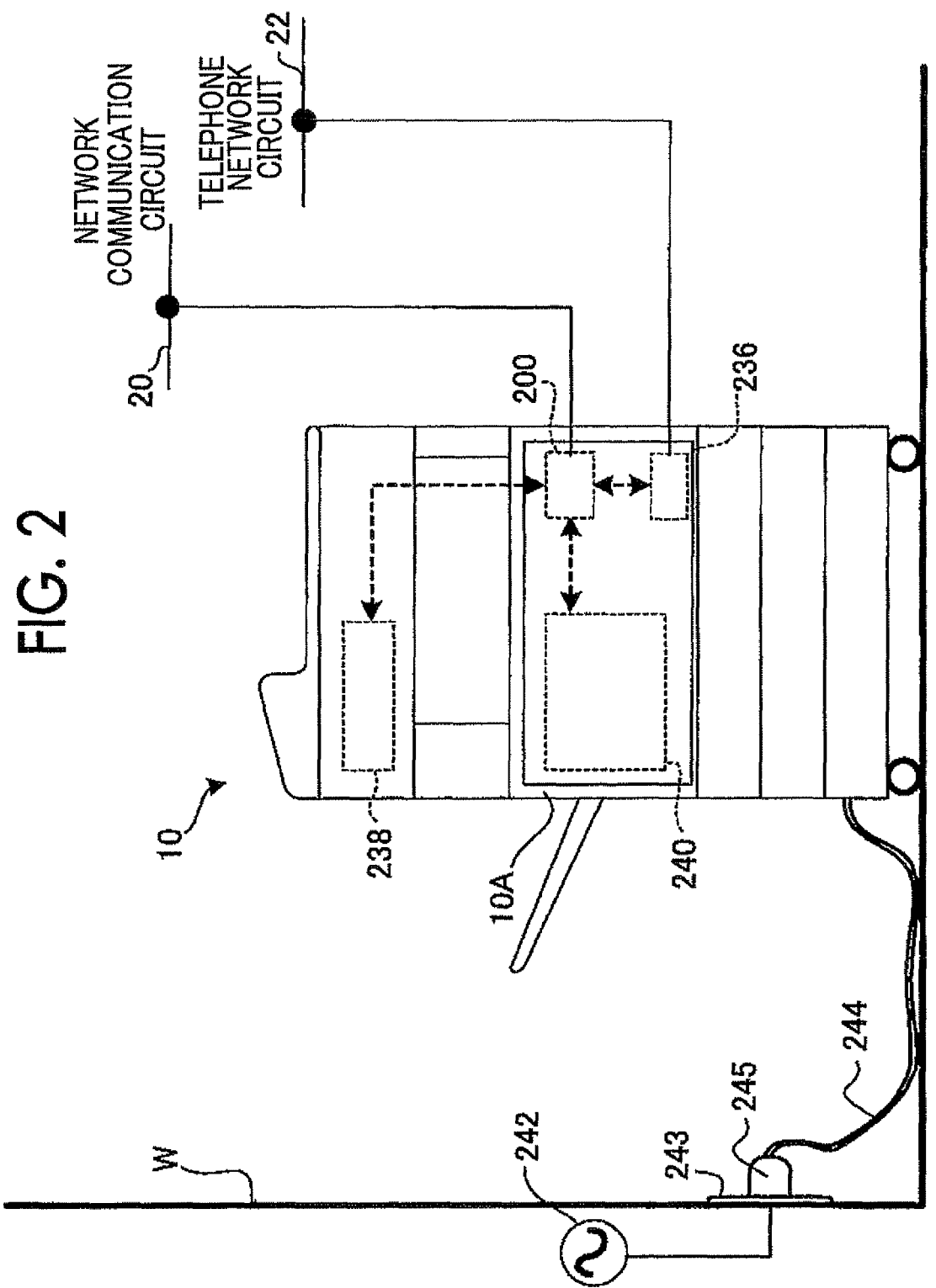
FIG. 2 is a schematic diagram of the image processing apparatus according to the present exemplary embodiment.

FIG. 2 illustrates the image processing apparatus 10 according to the present exemplary embodiment.

The image processing apparatus 10 includes an image forming section 240 that forms an image on a recording sheet, an image reading unit 238 that reads a document image, and a facsimile communication control circuit 236. The image processing apparatus 10 includes a main controller 200, and performs an operation of storing primarily the image data of the document image read by the image reading unit 238 and transmitting the read image data to the image forming section 240 or the facsimile communication control circuit 236 by controlling the image forming section 240, the image reading unit 238, and the facsimile communication control circuit 236.

The network communication circuit 20 such as the Internet is connected to the main controller 200, and a telephone circuit network 22 is connected to the facsimile communication control circuit 236. The main controller 200 is connected to a host computer via the network communication circuit 20, for example, and performs the role of receiving image data and executing reception and transmission of facsimiles using the telephone circuit network 22 via the facsimile communication control circuit 236.

In the image processing apparatus 10, a plug 245 is attached to the distal end of an input power line 244, and when the plug 245 is inserted into a wiring plate 243 of a commercial power supply 242 wired up to a wall surface W, the image processing apparatus 10 receives power from the commercial power supply 242.

Detailed Configuration of Image Processing Apparatus

Figure 3:
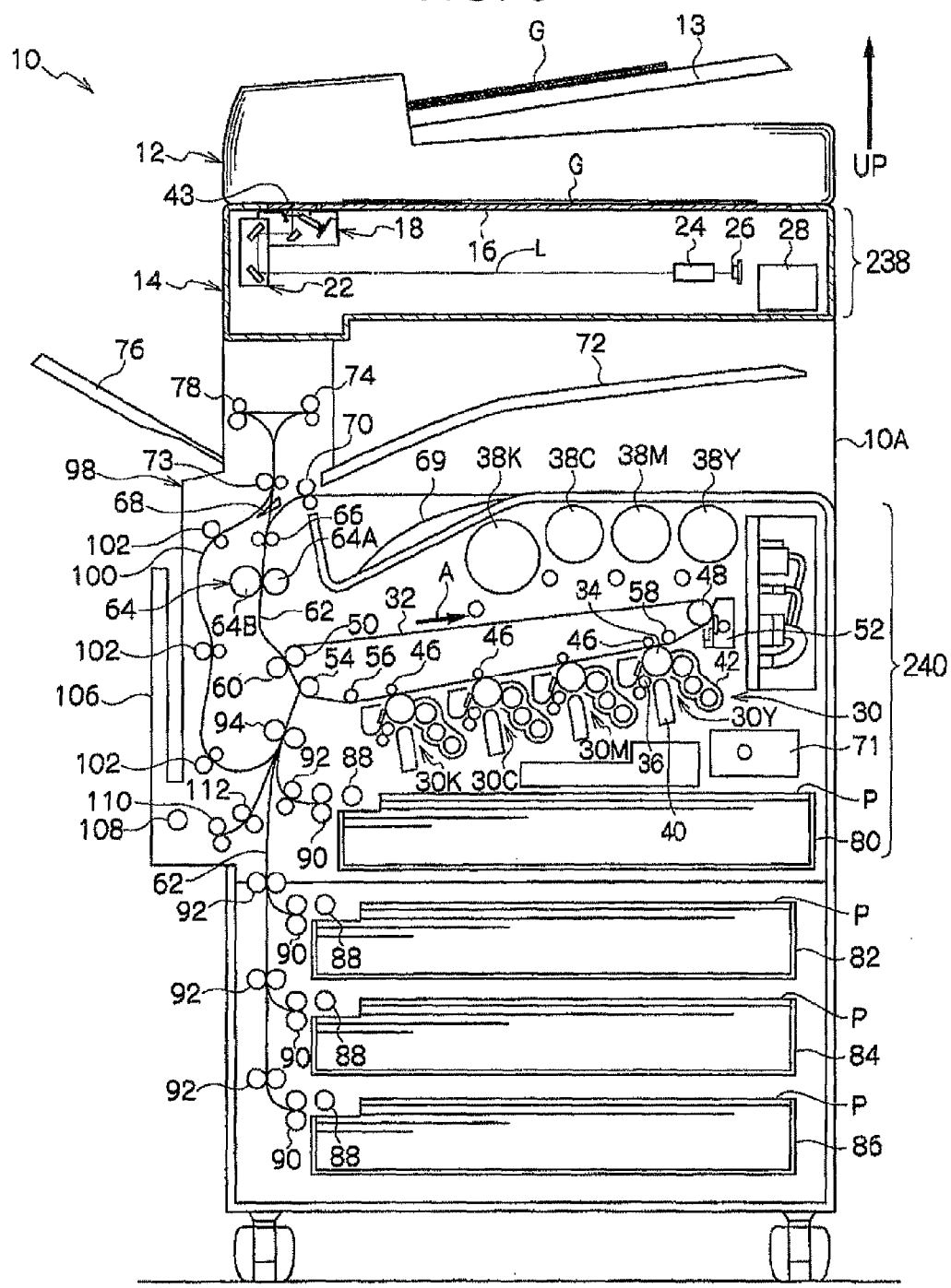
FIG. 3 is a detailed view of an internal configuration of the image processing apparatus according to the present exemplary embodiment.

As illustrated in FIG. 3, on top of an apparatus body 10A of the image processing apparatus 10 according to the present exemplary embodiment, an automatic document feeder 12 that automatically feeds multiple documents G one by one, a first platen glass 16 on which one document G is placed, and an image reading unit 238 that reads the document G fed by the automatic document feeder 12 or the document G placed on the first platen glass 16 are arranged. The automatic document feeder 12 includes a document platen 13 on which multiple documents G are placed.

The image forming section 240 including multiple image forming units 30 which form toner images of different colors and which are arranged in an inclined state in relation to the horizontal direction is disposed in the central portion in the vertical direction of the apparatus body 10A. An endless intermediate transfer belt 32 which circulates in the direction indicated by the arrow A in FIG. 3 and to which the toner images formed by the image forming units 30 of the respective colors are transferred is provided on the upper side of the image forming units 30.

As the image forming units 30, four image forming units 30Y, 30M, 30C, and 30K of the colors of yellow (Y), magenta (M), cyan (C), and black (K) are provided in that order.

Each of these four image forming units 30Y, 30M, 30C, and 30K basically includes an image carrier 34, a charging member 36, an exposure device 40, and a developing unit 42.

Toner cartridges 38Y, 38M, 38C, and 38K that supply toner of determined colors to the developing units 42 of the respective colors of yellow (Y), magenta (M), cyan (C), and black (K) are provided above the intermediate transfer belt 32. The toner cartridge 38K storing toner of the black (K) color is larger than the toner cartridges of the other colors since it is frequently used.

On the other hand, a primary transfer member 46 for transferring the toner image formed on the surface of the image carrier 34 to the intermediate transfer belt 32 is provided on the opposite side of the image carrier 34 with the intermediate transfer belt 32 interposed. Moreover, cleaning device 44 that cleans residual toner or the like remaining on the surface of the image carrier 34 without being transferred to the intermediate transfer belt 32 from the image carrier 34 is provided on the downstream side in the rotating direction of the image carrier 34 in relation to the primary transfer member 46 in a state of contacting the surface of the image carrier 34.

Here, light based on the image data of respective colors is sequentially output from the exposure devices 40 provided individually in the image forming units 30Y, 30M, 30C, and 30K. This light exposes the surface of the image carriers 34 of the respective colors, charged uniformly by the charging members 36, whereby electrostatic latent images are formed on the surface of the image carriers 34. The electrostatic latent images formed on the surface of the image carriers 34 are developed as toner images of respective colors by the developing units 42.

The toner images of the respective colors of yellow (Y), magenta (M), cyan (C), and black (K), sequentially formed on the surface of the image carriers 34 are multiply transferred by the primary transfer members 46 to the intermediate transfer belts 32 disposed in an inclined manner above the image forming units 30Y, 30M, 30C, and 30K of the respective colors.

The intermediate transfer belt 32 is wound around a driving roll 48 that applies a driving force to the intermediate transfer belt 32, a support roll 50 that is driven to rotate, a tension applying roll 54 that applies tension to the intermediate transfer belt 32, a first idle roll 56, and a second idle roll 58.

A cleaning device 52 that cleans the surface of the intermediate transfer belt 32 is provided on the opposite side of the driving roll 48 with the intermediate transfer belt 32 interposed.

A secondary transfer member 60 for secondarily transferring the toner image primarily transferred to the intermediate transfer belt 32 to a recording sheet P is disposed on the opposite side of the support roll 50 with the intermediate transfer belt 32 interposed.

Moreover, a fixing device 64 that fixes the toner image to the recording sheet P to which the toner image is transferred by the secondary transfer member 60 and which is transported along a transport path 62 is provided above the secondary transfer member 60. The fixing device 64 includes a heating roll 64A disposed on an image surface side of the recording sheet P and a pressure roll 6413 that pressurizes the recording sheet P toward the heating roll 64A.

Furthermore, a transport roll 66 and a switching gate 68 that switches the transport direction of the recording sheet P are provided on the downstream side in the transport direction of the recording sheet P in relation to the fixing device 64.

A first discharge roll 70 that discharges the recording sheet P guided by the switching gate 68 switched to one direction to a first discharge portion 69 is provided on the downstream side in the transport direction of the recording sheet P in relation to the switching gate 68.

Moreover, a second discharge roll 74 that discharges the recording sheet P guided by the switching gate 68 switched to the other direction and transported by a transport roll 73 to a second discharge portion 72 and a third discharge roll 78 that discharges the recording sheet P to a third discharge portion 76 are provided on the downstream side in the transport direction of the recording sheet P in relation to the switching gate 68.

On the other hand, sheet feeding units 80, 82, 84, and 86 in which the recording sheets P are stored are provided under the apparatus body 10A and on the upstream side in the transport direction of the recording sheet P in relation to the secondary transfer member 60. Recording sheets P of different sizes are stored in the respective sheet feeding units 80, 82, 84, and 86.

Furthermore, sheet feeding rolls 88 that take the recording sheet P stored in the respective sheet feeding units 80, 82, 84, and 86 out to the transport path 62 are provided the respective sheet feeding units 80, 82, 84, and 86. A transport roll 90 and a transport roll 92 that transport the recording sheets P one by one are provided on the downstream side in the transport direction of the sheet feeding roll 88.

Moreover, a registration roll 94 that temporarily stops the recording sheet P and delivers the same to the secondary transfer position at a determined timing is provided on the downstream side in the transport direction of the transport roll 92.

On the other hand, a duplex transport unit 98 that reverses and transports the recording sheet P in order to form an image on both sides of the recording sheet P is provided laterally to the secondary transfer position. A sheet reversing path 100 along which the recording sheet P transported by the transport roll 73 rotating in the reverse direction is conveyed is provided in the duplex transport unit 98. Moreover, multiple transport rolls 102 are provided along the sheet reversing path 100, and the recording sheet P transported by these transport rolls 102 is transported again by the registration roll 94 in a state where the recording sheet P is reversed back to front.

Moreover, a folding-type manual sheet feeding unit 106 is provided at the outer side than the duplex transport unit 98. A sheet feeding roll 308 and transport rolls 110 and 112 that transport the recording sheet P fed from the folding-type manual sheet feeding unit 106 in the using state are provided under the duplex transport unit 98. The recording sheet P transported by the transport rolls 110 and 112 is transported to the registration roll 94.

Hardware Configuration of Control System of Image Processing Apparatus

Figure 4:
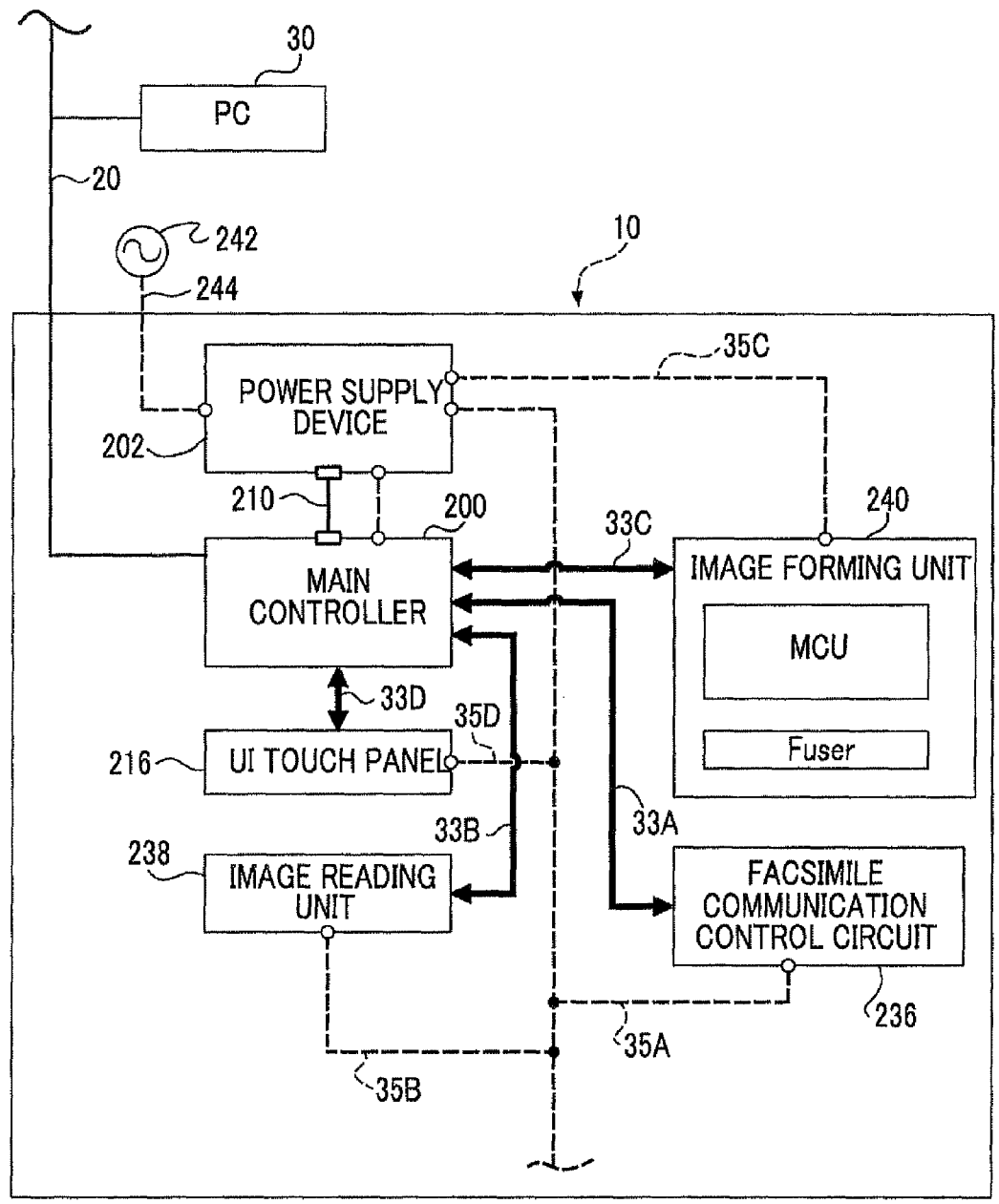
FIG. 4 is a block diagram illustrating the configuration of a control system of the image processing apparatus according to the present exemplary embodiment.

FIG. 4 is a schematic diagram of a hardware configuration of the control system of the image processing apparatus 10.

The network communication circuit 20 is connected to the main controller 200. The facsimile communication control circuit 236, the image reading unit 238, the image forming section 240, and a UI touch panel 216 are connected to the main controller 200 via buses 33A to 33D such as a data bus or a control bus, respectively. That is, the respective processing units of the image processing apparatus 10 are controlled independently by the main controller 200. In some cases, a backlight unit for the UI touch panel 216 is attached to the UI touch panel 216.

Moreover, the image processing apparatus 10 includes a power supply device 202 and is connected to the main controller 200 via a signal harness 201.

The power supply device 202 receives power from the commercial power supply 242.

The power supply device 202 includes power supply lines 35A to 35D that independently supply power to the main controller 200, the facsimile communication control circuit 236, the image reading unit 238, the image forming section 240, and the UI touch panel 216, respectively, which include independent CPUs. Thus, the main controller 200 enables so-called partial power-saving control to be realized by individually supplying power (power-supplying mode) or cutting the power supply (sleep mode) to respective processing units (devices). A control system including the CPU of the image forming section 240 hereinafter sometimes refers to as a MCU.

Moreover, a human sensor may be provided in the main controller 200 so as to monitor the presence of a person around the image processing apparatus 10 and perform power supply control.

Next, the fixing device 64 according to the present exemplary embodiment will be described. In the present exemplary embodiment, the heat-resistance temperature of the fixing device 64 is set to 240° C., and the set fixing temperature is set to 370° C.

Figure 5A:
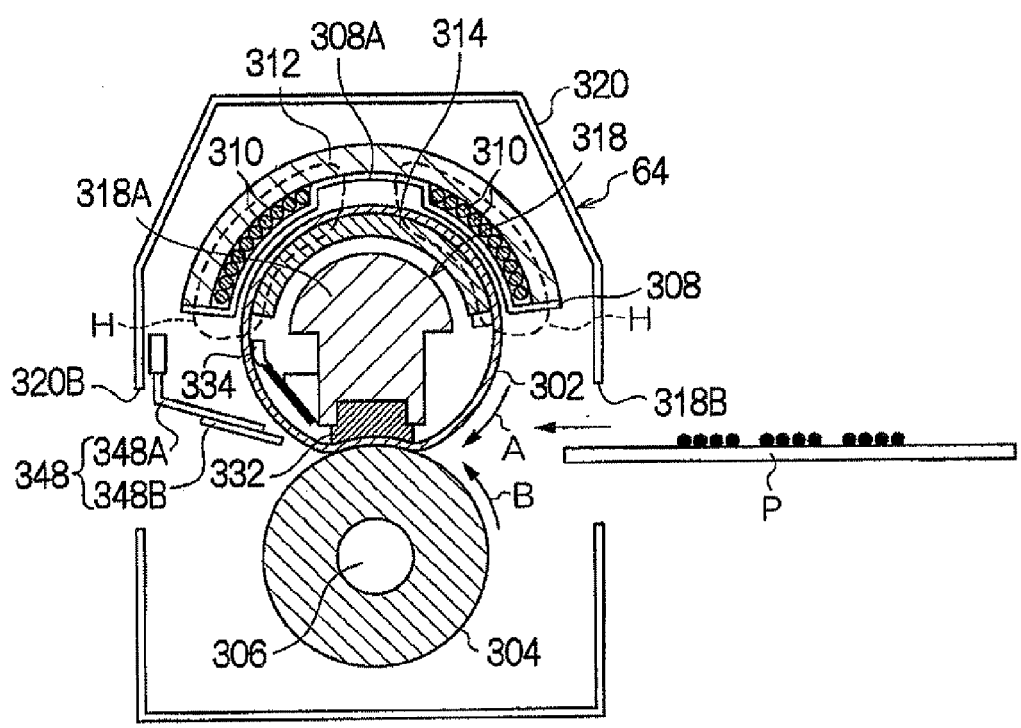
FIGS. 5A and 5B are cross-sectional views of a fixing device according to the present exemplary embodiment.
Figure 5B:
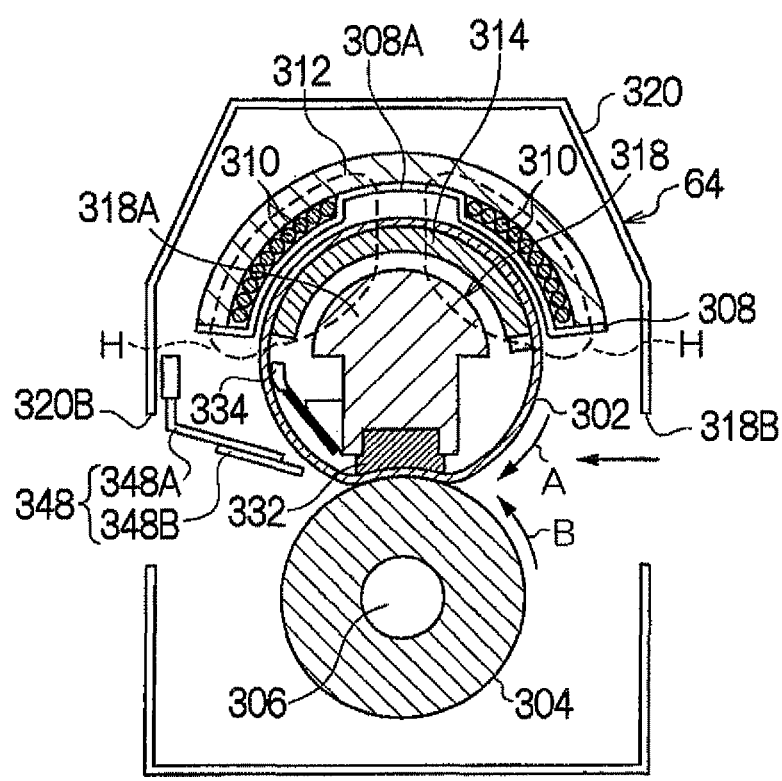

As illustrated in FIG. 5A, the fixing device 64 includes a housing 320 in which openings 320A and 320B for allowing the recording sheet P to enter or be discharged are formed. An endless fixing belt 302 is formed inside the housing 320, which forms the outer circumference of the heating roll 64A. Cylindrical cap members (not illustrated) having a rotation shaft are fitted to both ends of the fixing belt 302, and the fixing belt 302 are rotatably supported about the rotation shaft. A gear connected to a motor (not illustrated) that rotates the fixing belt 302 is bonded to one of the cap members. Here, when the motor is operated, the fixing belt 302 rotates in a direction indicated by the arrow A in FIG. 5A.

A bobbin 308 formed of an insulating material is disposed at a position facing the outer peripheral surface of the fixing belt 302. The bobbin 308 has an approximately arc-like shape which resembles the outer peripheral surface of the fixing belt 302, and a convex portion 308A protrudes from an approximately central portion of the surface of the bobbin 308 opposite to the fixing belt 302. The distance between the bobbin 308 and the fixing belt 302 is about 1 to 3 mm.

An excitation coil 310 that generates a magnetic field H by being energized is wound around the bobbin 308 multiple times in the axial direction (the depth direction of the sheet of FIG. 4A) about the convex portion 308A. A magnetic core 312 that has an approximately arc-like shape which resembles the arc-like shape of the bobbin 308 is disposed at a position facing the excitation coil 310 and is supported by the bobbin 308 or the excitation coil 310.

A temperature-sensitive magnetic member 314 that has an approximately arc-like planar shape which resembles the fixing belt 302 and contacts the inner peripheral surface of the fixing belt 302 is provided at the inner side of the fixing belt 302. The temperature-sensitive magnetic member 314 is disposed so as to face the excitation coil 310. Since the temperature-sensitive magnetic member 314 has a heat accumulating function, it is sometimes referred to as a "heat accumulating member."

An induction body 318 formed of aluminum is provided at the inner side of the temperature-sensitive magnetic member 314. The induction body 318 has a thickness equal to or greater than the skin depth, and is preferably formed of a non-magnetic metal having a small specific resistance. Silver, copper, and aluminum are suitable as the material thereof. The induction body 318 includes an arc portion 318A that faces the inner peripheral surface of the temperature-sensitive magnetic member 314 and a columnar portion 318B that is formed integrally with the arc portion 318A. Both ends of the induction body 318 are fixed to the housing 320 of the fixing device 64.

Moreover, the arc portion 318A of the induction body 318 is disposed in advance at such a position that the induction body 318 induces the magnetic flux of the magnetic field H when the magnetic flux of the magnetic field H passes through the temperature-sensitive magnetic member 314. The induction body 318 and the temperature-sensitive magnetic member 314 are separated by a distance of 1 to 5 mm. As will be described later, the induction body 318 and the temperature-sensitive magnetic member 314 are supported independently.

A pressing pad 332 for pressing the fixing belt 302 toward the outside with a predetermined pressure is fixed to and supported at the end surface of the columnar portion 318B of the induction body 318. In this way, it is not necessary to prepare members that support the induction body 318 and the pressing pad 332, respectively, and it is possible to decrease the size of the fixing device 64. The pressing pad 332 is formed of an elastic member such as urethane rubber or sponge. One end surface of the pressing pad 332 contacts the inner peripheral surface of the fixing belt 302 and presses the fixing belt 302.

The pressure roll 64B that is driven to rotate in the direction indicated by the arrow B in FIG. 5A (the direction opposite to the direction indicated by the arrow A in FIG. 5A) with respect to the rotation of the fixing belt 302 makes press-contact with the outer peripheral surface of the fixing belt 302.

The pressure roll 64B has a configuration in which a foamed silicon rubber sponge elastic layer having a thickness of 5 mm is provided around a core metal 306 that is formed of a metal such as aluminum, and the outer side of the foamed silicon rubber sponge elastic layer is covered by a releasing layer formed of carbon-containing PFA having a thickness of 50 μm. Moreover, the pressure roll 64B is configured to come into contact with or move away from the outer peripheral surface of the fixing belt 302 by a retracting mechanism in which a bracket (not illustrated) that rotatably supports the pressure roll 64B swings by a cam.

A thermistor 334 that measures the temperature of the inner peripheral surface of the fixing belt 302 is provided at the inner side of the fixing belt 302 so as to be in contact with a region which does not face the excitation coil 310 and is at the discharging side of the recording sheet P. The thermistor 334 measures the surface temperature of the fixing belt 302 by converting the resistance value that varies in accordance with the heat amount provided from the fixing belt 302 into the temperature. The contact position of the thermistor 334 is at a substantially central portion in the width direction of the fixing belt 302 such that the measured value does not change with the magnitude of the size of the recording sheet P.

The thermistor 334 is connected to an MCU (see FIG. 4) of the image forming section 240. The MCU carries out temperature conversion based on the quantity of electricity sent from the thermistor 334 and measures the temperature of the surface of the fixing belt 302. Then, the MCU compares this measured temperature and a set fixing temperature stored in advance (for example, 370° C.). If the measured temperature is lower than the set fixing temperature, the MCU energizes the excitation coil 310 and causes the magnetic field H (see FIG. 5A) serving as a magnetic circuit to be generated. If the measured temperature is higher than the set fixing temperature, the MCU stops the energization.

A peeling member 348 is provided at the vicinity of the contact portion (nip portion) of the fixing belt 302 and the pressure roll 64B on the downstream side in the transport direction of the recording sheet P. The peeling member 348 includes a supporting portion 348A whose one end is fixed and a peeling sheet 348B supported by the supporting portion 348A. The distal end of the peeling sheet 348B is disposed so as to approach or be in contact with the fixing belt 302.

Next, the mechanism for causing the temperature-sensitive magnetic member 314 to come into contact with and be separated from the fixing belt 302 will be described.

Here, as the fixing mode of the fixing device 64, a fixing process in a state where the temperature-sensitive magnetic member 314 is in contact with the fixing belt 302 will be referred to as "heat accumulating mode," and a fixing process in a state where the temperature-sensitive magnetic member 314 is separated from the fixing belt 302 will be referred to as "rapid heating mode." Specifications of the respective fixing modes will be described later.

As shown in FIG. 6, a pair of side plates 352 and 354 stands at the interior of the fixing device 64 so as to interpose both ends of the fixing belt 302 and the pressure roll 64B. Through-holes 352A and 354A whose diameters are smaller than the inner diameter of the fixing belt 302 are formed at positions of the side plates 352 and 354, which face both ends of the fixing belt 302.

Moreover, supporting members 356 and 358 are provided at the inner walls of the side plate 352 and the side plate 354, respectively, by fixing members (not illustrated) such as screws. The supporting member 356 includes a flat plate portion 356A fixed to the side plate 352, a cylindrical shaft portion 356B that protrudes from the flat plate portion 356A, and a through-hole 356C that passes through the flat plate portion 356A and the shaft portion 356B.

Similarly, the supporting member 358 includes a flat plate portion 358A fixed to the side plate 354, a cylindrical shaft portion 358B that protrudes from the flat plate portion 358A, and a through-hole 358C that passes through the flat plate portion 358A and the shaft portion 358B.

The through-hole 352A and the through-hole 356C have the same diameters and are in a communicating state in which the inner peripheral walls thereof coincide. Similarly, the through-hole 354A and the through-hole 358O have the same diameter and are in a communicating state in which the inner peripheral walls thereof coincide.

A bearing 360 is externally inserted to the shaft portion 356B, a bearing 362 is externally inserted to the shaft portion 358B, and both are fixed. Here, the outer diameters of the bearings 360 and 362 are substantially the same as the inner diameter of the fixing belt 302. The inner peripheral surface of both ends of the fixing belt 302 is bonded and fixed to the outer peripheral surfaces of the bearings 360 and 362. In this way, the fixing belt 302 is rotatable about the centers of the shaft portions 356B and 358B.

A gear 364 for rotation driving is mounted on the outer peripheral surface at one end of the fixing belt 302 at the shaft portion 358B side. The gear 364 is driven by a motor (not illustrated).

On the other hand, one set of ends of supporting members 366 and 368 that are substantially L-shaped in cross-section are bonded to both ends of the temperature-sensitive magnetic member 314. A flat plate portion 366A and a flat plate portion 368A are formed at the other end sides of the supporting members 366 and 368. The supporting members 366 and 368 are formed of members having low heat conductivity so that the heat of the temperature-sensitive magnetic member 314 is not directly transferred to the supporting members 366 and 368.

The flat plate portion 366A is inserted through the through-hole 356C and the through-hole 352A and protrudes further toward the outer side than the side plate 352. Similarly, the flat plate portion 368A is inserted through the through-hole 358C and the through-hole 354A and protrudes further toward the outer side than the side plate 354.

A base 370, which is wide and in which a recess 370A is formed in a top surface thereof, is provided on the lower side of the flat plate portion 366A. The base 370 is fixed to the outer wall of the side plate 352. The recess 370A is at a position facing the end portion of the flat plate portion 366A of the supporting member 366.

Similarly, a base 372, which is wide and in which a recess 372A is formed in a top surface thereof, is provided on the lower side of the flat plate portion 368A. The base 372 is fixed to the outer wall of the side plate 354. The recess 372A is at a position facing the end portion of the flat plate portion 368A of the supporting member 368.

Here, one end of a coil spring 374 is fixed to the recess 370A, and the other end of the coil spring 374 is fixed to the bottom surface of the flat plate portion 366A. Similarly, one end of a coil spring 376 is fixed to the recess 372A, and the other end of the coil spring 376 is fixed to the bottom surface of the flat plate portion 368A. In this way, the temperature-sensitive magnetic member 314 is supported so as to be movable in the vertical direction.

In the state (at the position) in which the coil springs 374 and 376 extend completely, the temperature-sensitive magnetic member 314 comes into contact with the inner peripheral surface of the fixing belt 302. In this way, the fixing belt 302 is not deformed outwardly by the temperature-sensitive magnetic member 314.

An electric cylinder 378 is provided above the flat plate portion 366A at a position facing the coil spring 374. The electric cylinder 378 has a cylinder 380 that may be projected from one side of the electric cylinder 378 or housed therein. The electric cylinder 378 is fixed to the outer wall of the side plate 352 such that the cylinder 380 is directed downward.

Similarly, an electric cylinder 382 is provided above the flat plate portion 368A at a position facing the coil spring 376. The electric cylinder 382 has a cylinder 384 that may be projected from one side of the electric cylinder 382 or housed therein. The electric cylinder 382 is fixed to the outer wall of the side plate 354 such that the cylinder 384 is directed downward.

In the state in which the cylinder 380 is housed so that the length is shortened, the end surface thereof slightly contacts the top surface of the flat plate portion 366A. Similarly, in the state in which the cylinder 384 is housed so that the length is shortened, the end surface thereof slightly contacts the top surface of the flat plate portion 368A. In both of the electric cylinders 378 and 382, the extending and contracting operations of the cylinders 380 and 384 are carried out by solenoid driving, motor driving, or the like. An air cylinder and a hydraulic cylinder that extends and contracts the cylinders 380 and 384 by opening and closing a solenoid valve by electric control may also be employed.

Figure 7A:
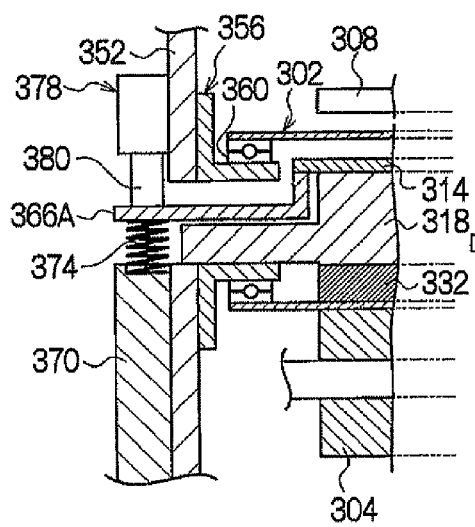

Here, in the present exemplary embodiment, when the fixing mode is "rapid heating mode," the MCU of the image forming section 240 controls the operations of the electric cylinders 378 and 382 so that the cylinders 380 and 384 are contracted as illustrated in FIG. 7A. Thus, the temperature-sensitive magnetic member 314 and the fixing belt 302 are held in a separated state as illustrated in FIG. 7B.

Figure 7C:
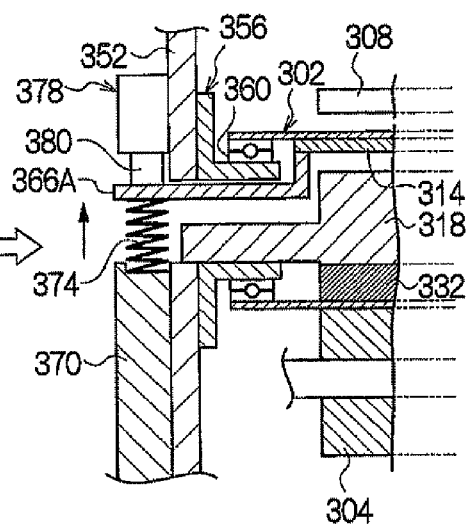
Figure 7B:
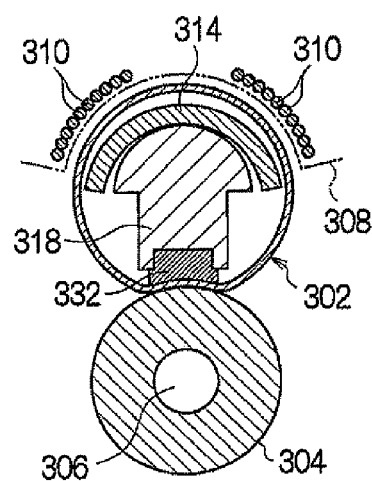
Figure 7D:
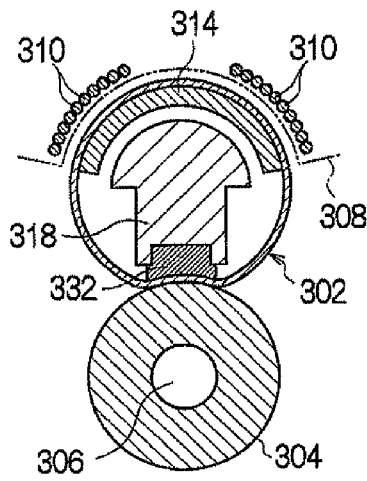

On the other hand, when the fixing mode is "heat accumulating mode," the MCU of the image forming section 240 controls the operations of the electric cylinders 378 and 382 so that the cylinders 380 and 384 are extended as illustrated in FIG. 7C. Thus, the temperature-sensitive magnetic member 314 and the fixing belt 302 are held in a contacting state as illustrated in FIG. 7D.

Basic Specifications of Fixing Device 64

The fixing device of the present exemplary embodiment includes a "rapid heating mode" and a "heat accumulating mode" as a mode (fixing mode) of executing a fixing process, and basically, the mode is selectively switched depending on an image formation processing count.

Table 1 is a comparison table of "rapid heating mode" and "heat accumulating mode." As understood from Table 1, when total processing time is compared, "rapid heating mode" is appropriate for processing a small number of pages of about 1 to several pages (hereinafter referred to "N pages"), and "heat accumulating mode" is appropriate for processing a large number of pages exceeding N pages. Although the processing count N which serves as the threshold for selecting the fixing mode is naturally different depending on the specifications of the image processing apparatus 10, the processing count N is preferably set to N=about 5 to 6 pages under the specifications of Table 1.

TABLE 1

| Fixing Mode Name | Relation Between Fixing Belt and Heat Accumulating Member | FPOT (FCOT) | Processing Capability | Residual Power |
| --- | --- | --- | --- | --- |
| Rapid Heating Mode | Separated (Non-Contact) | Fast (3 sec) | Slow (20 To 35 ppm) | Not Present |
| Heat Accumulating Mode | Contact | Slow (13 sec) | Fast (40 To 50 ppm) | Present |

In Table 1, "Fast" and "Slow" represent a relative relation between modes, and the numerical values inside parentheses are examples.

Thus, in the case of a copying process, for example, the image reading unit 238 reads a document image and selectively switches the fixing mode of the fixing device 64 using the processing count of N pages as a threshold. Naturally, the processing count is determined based on an accumulation value of the number of copies for one document. For example, when there are two documents and the number of copies is 5, the processing count is 10 pages.

Fixing Mode Switching Control

As in the case of the copying process, when processing is performed within the range of the devices of the image processing apparatus 10, in many case, the processing count is known before the image formation process by the image forming section 240 is started. Thus, the MCU of the image forming section 240 may easily selectively switch the fixing mode between "rapid heating mode" and "heat accumulating mode" based on the processing count.

In contrast, when a request is received from the outside of the image processing apparatus 10, that is, when an image formation instruction (hereinafter referred to as a "print instruction") is requested from the PC 21 (see FIGS. 1A and 1B), an operator operating the PC 21 registers information on the print instruction in accordance with a setting screen of a printer driver control program installed in advance in the PC and transmits a job execution request to the main controller 200 of the image processing apparatus 10 together with image information (print data).

In this case, the main controller 200 of the image processing apparatus 10 performs the following steps in response to the job execution request.

Step 1

When the job execution request is received, print instruction information (sheet type and size, fonts, print data, and the like) is read.

Step 2

The print instruction information read in Step 1 is compared with image processing parameters registered in the image processing apparatus 10.

Step 3

As the result of the comparison of Step 2, it is determined whether image processing may be performed in accordance with the print instruction information as instructed.

Step 4

As the result of the determination of Step 3, if the processing is possible, the processing is performed as instructed. If the processing is not possible, after a substitute treatment is performed, print data is decompressed to generate printing data.

Step 5

The printing data generated in Step 4 is transmitted to the MCU of the image forming section 240.

As above, when a print instruction is received from the outside of the image processing apparatus 10, it is not possible to select an appropriate fixing mode unless the steps up to Step 4 are completed. This period may become the cause of extending so-called FPOT (first print output time).

Thus, in the present exemplary embodiment, the printer driver adds fixing mode switching determination data as information (data header) which comes earlier than the request such as a print instruction included in the job execution request. First, the printer driver transmits the fixing mode switching determination parameter information and then transmits the job execution request (image data or the like). The printer driver is a program installed in the PC 21, and the image processing apparatus 10 is physically separated from the PC 21 in which the printer driver is installed. However, the printer driver is a program unique to the image processing apparatus 10 in which the printer driver is applied in advance and functions as a part of the control system of the image processing apparatus 10.

In the image processing apparatus 10, the fixing mode is determined to be "rapid heating mode" or "heat accumulating mode" based on the fixing mode switching determination data added to the data header of the job execution request before the print data is decompressed in respective pages in order to form images.

Next, the operation of the present exemplary embodiment will be described.

Control of a job execution request from the outside of the image processing apparatus 10, for example, from the PC 21 illustrated in FIGS. 1A and 1B and control of an image formation process on the image forming section 240 by the main controller 200 when the control of the job execution request is performed will be described with reference to the flowcharts of FIGS. 8 and 9.

Figure 8:
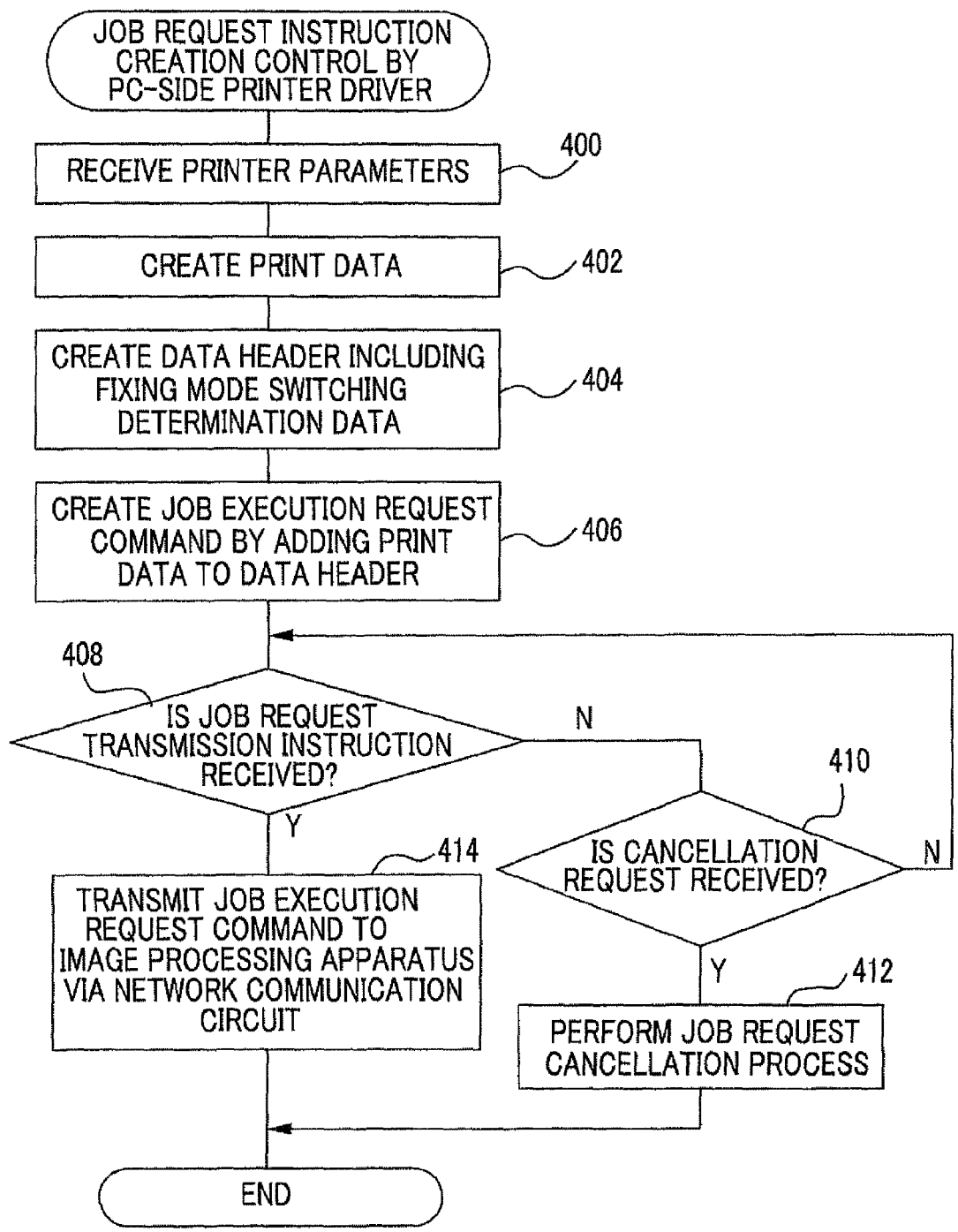
FIG. 8 is a flowchart illustrating a job request instruction creation control routine by a PC-side printer driver according to the present exemplary embodiment.

FIG. 8 is a flowchart illustrating a job request instruction creation control routine by the printer driver of the PC 21.

In step 400, printer parameters are received. Printer parameters stored in advance may be read. Subsequently, in step 402, print data is created. The print data includes information on the number of copies, a sheet type, monochrome/color, image density, and the like in addition to image data.

When creation of print data in step 402 ends, the flow proceeds to step 404, and a data header for the job request instruction for sharing information such as a communication protocol is created. In this case, based on the information on the number of copies, a sheet type, monochrome/color, image density, and the like included in the print data, fixing mode switching determination data regarding whether the fixing mode of the fixing device 64 executed by the image forming section 240 will be set to a rapid heating mode or a heat accumulating mode is added. The fixing mode switching determination data is set based on Table 1, and basically, may be set depending on whether or not the print count is N pages or smaller.

During the basic determination, for example, when the thickness of a sheet is thicker than a normal sheet, the value of N, which is a threshold count, is decreased. When the thickness of a sheet is thinner than the normal sheet, the value N is increased. Alternatively, when a monochrome image is used as a reference, the N value for a color image may be decreased. Moreover, when image density is higher than a basic setting value, correction may be performed so that the N value is decreased. "Decreasing the N value" means that the heat accumulating mode is made more easily selected.

Subsequently, in step 406, the print data created in step 402 is added to the data header created in step 404, and the flow proceeds to step 408.

Subsequently, in step 408, it is determined whether a job request transmission instruction is received from an operator who is operating the printer driver. For example, the job request transmission instruction is output when the operator clicks on an "OK" button on the printer driver screen.

When a negative determination result is obtained in step 408, the flow proceeds to step 410, and it is determined whether a cancellation request is received. When a negative determination result is obtained in step 410, the flow returns to step 408, and the processes of steps 408 and 410 are repeated until a positive determination result is obtained in any one of the steps.

When a positive determination result is obtained in step 410, the flow proceeds to step 412, and a job request cancellation process is performed. In this way, this routine ends.

When a positive determination result is obtained in step 408, the flow proceeds to step 414, the job request command is transmitted to the image processing apparatus 10 via the network communication circuit 20.

Figure 9:
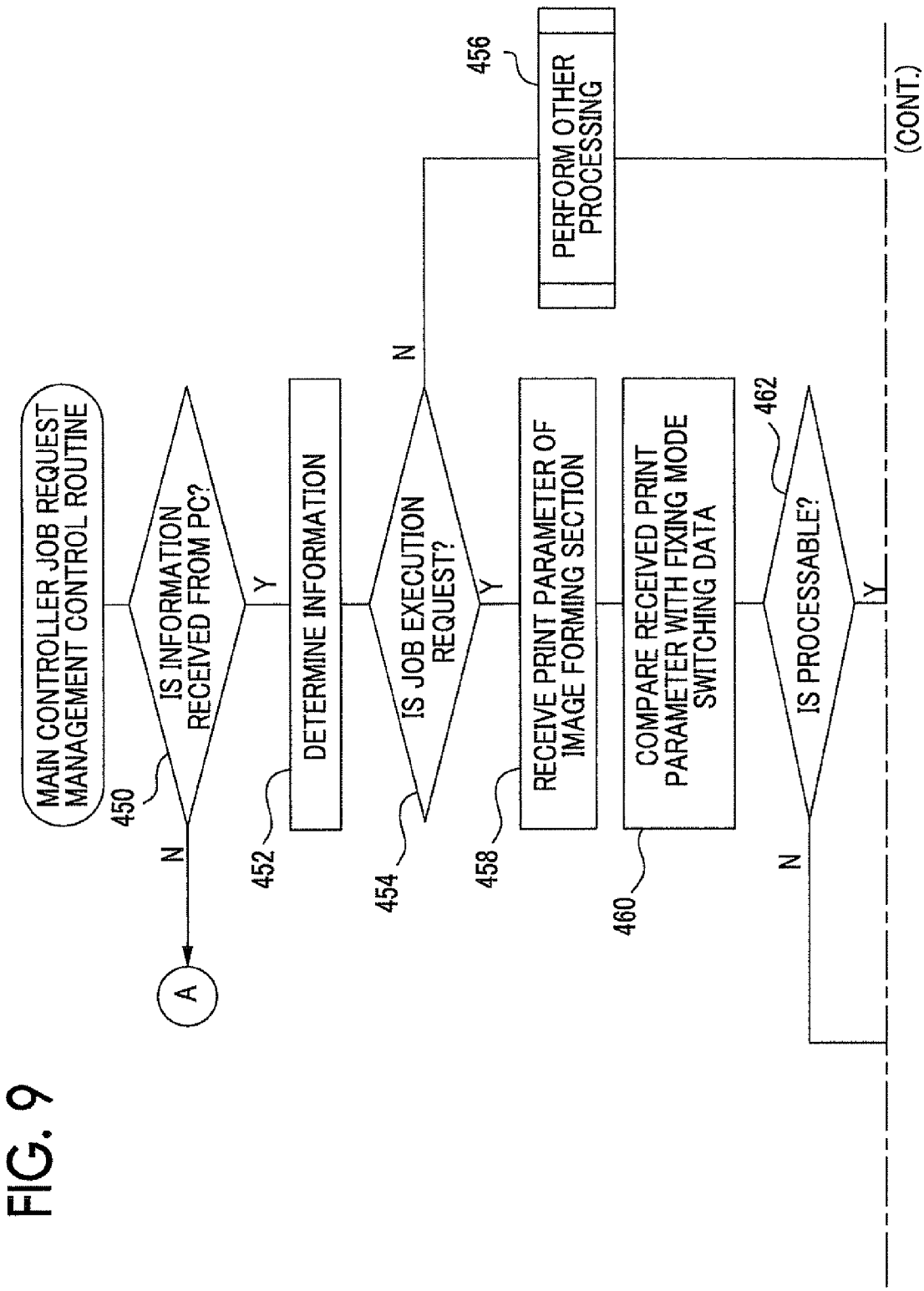
FIG. 9 is a flowchart illustrating a job request management control routine by a main controller of the image processing apparatus according to the present exemplary embodiment.

FIG. 9 is a flowchart illustrating a job request management control routine in the main controller 200 of the image processing apparatus 10.

In step 450, it is determined whether information is received from the PC 21, and when a negative determination result is obtained, this routine ends.

Moreover, when a positive determination result is obtained in step 450, the flow proceeds to step 452, and the information is determined.

Subsequently, in step 454, it is determined whether the information determined in step 452 is the job execution request. When a negative determination result is obtained, the flow proceeds to step 456, and other processing is performed. In this way, this routine ends.

Moreover, when it is determined in step 454 that the information is the job execution request, that is, when a positive determination result is obtained, the flow proceeds to step 458.

In step 458, print parameters of the image forming section are received. Subsequently, in step 460, the received print parameters are compared with the fixing mode switching data added to the data header of the job execution request, and the flow proceeds to step 462.

In step 462, it is determined whether an image forming process is possible under the designations of a sheet type or the like included in the fixing mode switching data. When a negative determination result (not processable) is obtained, the flow proceeds to step 464, and a substitute process is performed. When the substitute process is performed, the fixing mode switching data is changed, and the flow returns to step 462.

Moreover, when a positive determination result (processable) is obtained in step 462, the flow proceeds to step 466, and the fixing mode is selected based on the determined fixing mode switching data. Then, the flow proceeds to step 468.

In step 468, the selected fixing mode is determined. As the result of the determination, if "rapid heating mode" is selected, the flow proceeds to step 470, and switching to "rapid heating mode" is notified to the MCU of the image forming section 240. Then, the flow proceeds to step 474. When the determination result of step 468 is "heat accumulating mode," the flow proceeds to step 472, and switching to "heat accumulating mode" is notified to the MCU of the image forming section 240. Then, the flow proceeds to step 474.

When the MCU of the image forming section 240 is notified of the switching of the fixing mode to "rapid heating mode," the MCU of the image forming section 240 controls the operations of the electric cylinders 378 and 382 so that the cylinders 380 and 384 are retracted as illustrated in FIG. 7A. Thus, the temperature-sensitive magnetic member 314 and the fixing belt 302 are held in a separated state as illustrated in FIG. 7B.

On the other hand, when the MCU of the image forming section 240 is notified of the switching of the fixing mode to "heat accumulating mode," the MCU of the image forming section 240 controls the operations of the electric cylinders 378 and 382 so that the cylinders 380 and 384 are extended as illustrated in FIG. 7C. Thus, the temperature-sensitive magnetic member 314 and the fixing belt 302 are held in a contacting state as illustrated in FIG. 7D.

In the present exemplary embodiment, since two fixing modes are prepared, any one of the fixing modes is surely set. Thus, when the notified fixing mode is identical to the current fixing mode, the switching operation is not necessary. A so-called home position may be prepared so that any of the fixing modes may be immediately dealt with.

Subsequently, in step 474, the print data added to the data header of the job execution request command is decompressed into images of respective pages, for example. Then, the flow proceeds to step 476, and the data decompressed in respective units is transmitted to the MCU of the image forming section 240, and an image formation instruction is transmitted. In this way, this routine ends.

When the fixing mode switching data for selecting the fixing mode is added to the data header of the job execution request, an operation of mechanically switching the fixing mode is executed even when the print data added to the data header, for example, is decompressed in respective pages.

Modification Example

In the above embodiment, in the job request instruction creation control routine by the PC-side printer driver illustrated in FIG. 8, after the print data is created in step 402, a data header including the fixing mode switching determination data is created in step 404. However, the step 402 of FIG. 8 may be executed after the job execution request command is transmitted to the image processing apparatus via the network communication circuit in step 414. This flow is illustrated in FIG. 10. In FIG. 10, the step numbers and the processing content are the same as those of FIG. 8, and a symbol A is added to the end of step numbers.

In the embodiment illustrated in FIG. 8, when the print data creation process is performed before the job execution request command is transmitted, it is possible to extract parameters necessary of switching the mode when creating the print data. However, it may take a long time until an output OK message is output after a print instruction is output as compared to the modification example illustrated in FIG. 10.

On the other hand, in the modification example illustrated in FIG. 10, when the print data creation process is performed after the job execution request command is transmitted, since a heating execution instruction may be output to the fixing device 64 earlier than the embodiment illustrated in FIG. 8, it is possible to warm up the fixing device 64. On the other hand, it is necessary to extract parameters before the printer driver creates the print data, which may result in waste of effort and time. In the process flow of FIG. 9, it is possible to save the time for receiving printer parameters and creating print data.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a mode switching unit that selectively switches a mode between a rapid heating mode, which is a mode of heating a fixing member in advance before contacting a recording sheet and which aims for relatively rapid heating, and a heat accumulating mode which aims for heat accumulation to achieve a relatively high productivity in a fixing unit which functions as a part of an image forming section and which performs at least a heating process on the recording sheet to fix developer to the recording sheet after a developing process is performed on the recording sheet using the developer;
a receiving unit that receives an image formation request received from the outside;
an extracting unit that extracts mode switching determination information at the earliest from the image formation request received by the receiving unit;
a selecting unit that selects the mode based on the mode switching determination information extracted by the extracting unit, specifications of the fixing device, and a current temperature; and
a switching control unit that controls the mode switching unit based on the mode selected by the selecting unit to switch the mode to the rapid heating mode or the heat accumulating mode, wherein
the selecting unit includes a table which the selecting unit uses when selecting the mode based on the mode switching determination information extracted by the extracting unit, specifications of the fixing device, and a current temperature, and
the table stores the type of recording sheet prepared in the image forming section, executability of monochrome/color, and a resolution, and
the table is rewritable.

2. The image processing apparatus according to claim 1, wherein
the mode switching determination information includes at least information on the number of pages processed during image formation processing, and
at least one of information on the type of recording sheet used for image formation processing, information on a color type of monochrome or color, and quantitative information on image density, is added as necessary.

3. The image processing apparatus according to claim 1, wherein
the current temperature of the fixing device is estimated from the time elapsed from the end of previous image formation processing.

4. The image processing apparatus according to claim 2, wherein
the current temperature of the fixing device is estimated from the time elapsed from the end of previous image formation processing.

5. The image processing apparatus according to claim 2, wherein
the selecting unit includes a table which the selecting unit uses when selecting the mode based on the mode switching determination information extracted by the extracting unit, specifications of the fixing device, and a current temperature, and the table stores the type of recording sheet prepared in the image forming section, executability of monochrome/color, and a resolution, and the table is rewritable.

6. The image processing apparatus according to claim 3, wherein the selecting unit includes a table which the selecting unit uses when selecting the mode based on the mode switching determination information extracted by the extracting unit, specifications of the fixing device, and a current temperature, and the table stores the type of recording sheet prepared in the image forming section, executability of monochrome/color, and a resolution, and the table is rewritable.

7. The image processing apparatus according to claim 4, wherein the selecting unit includes a table which the selecting unit uses when selecting the mode based on the mode switching determination information extracted by the extracting unit, specifications of the fixing device, and a current temperature, and the table stores the type of recording sheet prepared in the image forming section, executability of monochrome/color, and a resolution, and the table is rewritable.

8. A non-transitory computer readable medium storing an image processing control driver in which a program is included, wherein when an image processing execution request is transmitted to the image processing apparatus according to claim 1 via a communication circuit network, the program transmits the mode switching determination information after the image processing execution request is received and before image information for the image processing is transmitted.

9. The non-transitory computer readable medium according to claim 8, wherein the mode switching determination information is added to a data header of a job request instruction including communication protocols for sharing information.

10. The non-transitory computer readable medium according to claim 8, wherein the mode switching determination information is indirect information including at least information on the number of pages processed during image formation processing or direct information indicating the rapid heating mode or the heat accumulating mode.

11. The non-transitory computer eadable medium according to claim 9, wherein the mode switching determination information is indirect information including at least information on the number of pages processed during image formation processing or direct information indicating the rapid heating mode or the heat accumulating mode.

12. The non-transitory computer readable medium according to claim 10, wherein at least one of information on the type of recording sheet used for image formation processing, information on a color type of monochrome or color, and quantitative information on image density, is added to the indirect information as necessary.

13. The non-transitory computer readable medium according to claim 11, wherein at least one of information on the type of recording sheet used for image formation processing, information on a color type of monochrome or color, and quantitative information on image density, is added to the indirect information as necessary.

14. An image processing method comprising:

selectively switching a mode between a rapid heating mode, which is a mode of heating a fixing member in advance before contacting a recording sheet and which aims for relatively rapid heating, and a heat accumulating mode which aims for heat accumulation to achieve a relatively high productivity in a fixing unit which functions as a part of an image forming section and which performs at least a heating process on the recording sheet to fix developer to the recording sheet after a developing process is performed on the recording sheet using the developer;

receiving an image formation request received from the outside;

extracting mode switching determination information at the earliest from the image formation request received by the receiving step;

selecting the mode based on the mode switching determination information extracted by the extracting step, specifications of the fixing device, and a current temperature; and controlling the mode switching step based on the mode selected by the selecting step to switch the mode to the rapid heating mode or the heat accumulating mode, wherein selecting the mode comprises utilizing a selecting unit that includes a table which the selecting unit uses to selecting the mode based on the mode switching determination information extracted in the extracting step, specifications of the fixing device, and a current temperature, and the table stores the type of recording sheet prepared in the image for section, executability of monochrome/color, and a resolution, and the table is rewritable.

\* \* \* \* \*